UNITED STATES PATENT OFFICE.

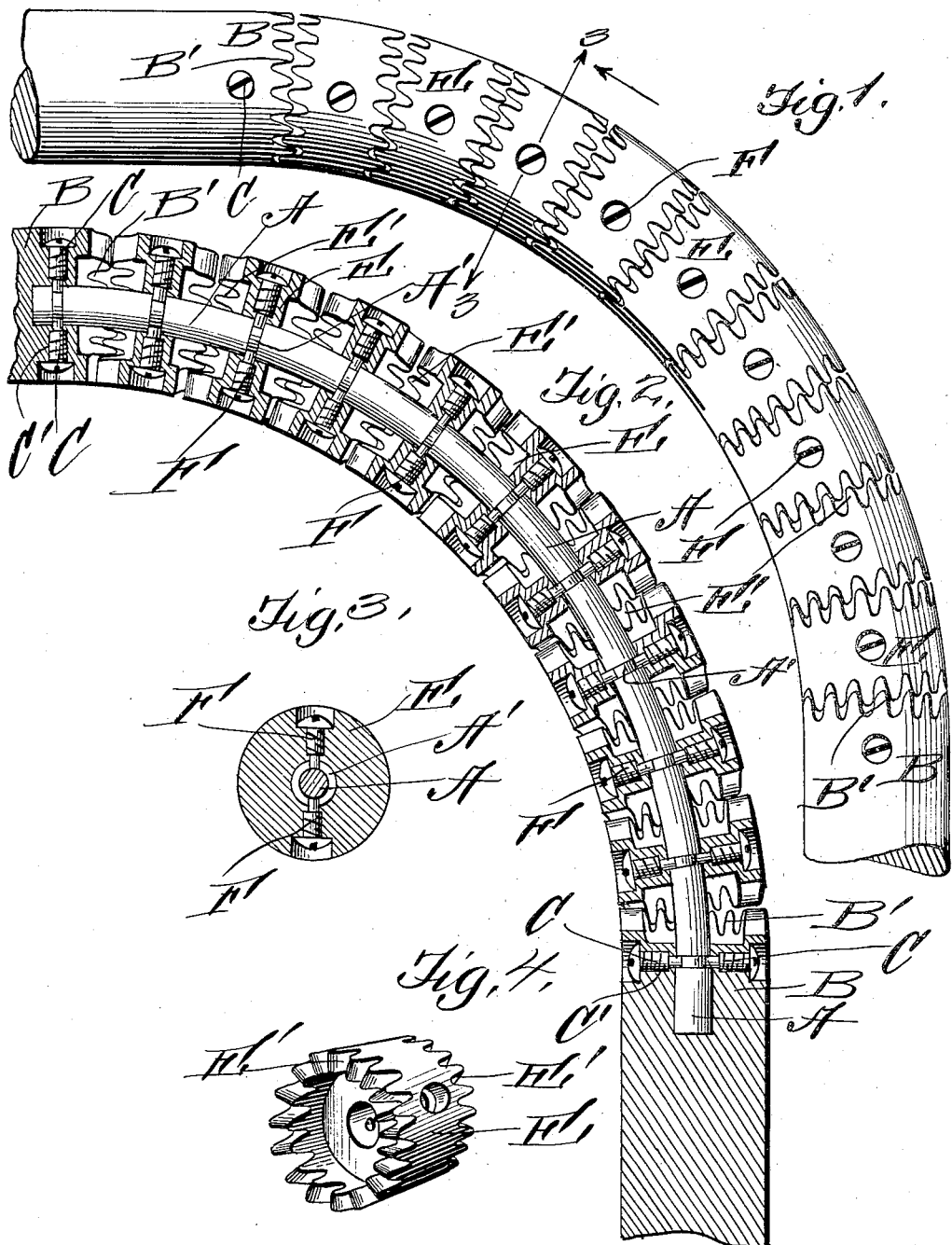

MORRIS C. LOCKWOOD, OF VINELAND, NEW JERSEY, ASSIGNOR OF ONE-HALF TO HARRY MICKLE, OF VINELAND, NEW JERSEY.

FLEXIBLE SHAFT.

No. 829,977.  Specification of Letters Patent.  Patented Sept. 4, 1906.

Application filed May 29, 1906. Serial No. 319,312.

*To all whom it may concern:*

Be it known that I, MORRIS C. LOCKWOOD, a citizen of the United States, residing at Vineland, in the county of Cumberland and State of New Jersey, have invented certain new and useful Improvements in Flexible Shafts; and I do hereby declare the following to be a full, clear, and exact description of the invention, such as will enable others skilled in the art to which it appertains to make and use the same, reference being had to the accompanying drawings, and to the letters of reference marked thereon, which form a part of this specification.

This invention relates to new and useful improvements in rigid rotatable elbow connections for shafts; and the object of the invention is to produce a device of this nature in which a shaft is adapted to transmit motion about an angle and comprises various details of construction and combinations and arrangements of parts, which will be hereinafter fully described, and then specifically defined in the appended claims.

My invention is illustrated in the accompanying drawings, in which—

Figure 1 is a side elevation of my invention. Fig. 2 is a central longitudinal sectional view. Fig. 3 is a cross-sectional view of line 3 3 of Fig. 1, and Fig. 4 is a perspective view of one of the links of the shaft.

Reference now being had to the details of the drawings by letter, A designates a rigid curved rod having a series of annular grooves A' formed therein, and the ends of said rod are adapted to be swiveled in the ends of the stub-shafts B. Said stub-shafts B have series of teeth B' projecting from their inner faces, and C C designate set-screws, which are passed through apertures C' in said shafts, and the inner end of each set-screw is slightly contracted beyond its threaded portion and is adapted to engage one of the annular grooves A', said screws being adapted to move with the stub-shafts as they rotate about the rod.

E E designate series of gears with teeth E' projecting from the opposite ends thereof in alinement with each other in pairs, and each of said gears E has preferably two apertures formed in alinement with each other and through which screws F are adapted to pass, the inner ends of said screws being contracted and adapted to travel in the grooves A', formed in said rod. The entire angle or elbow of my shaft is made up of these gears with their teeth intermeshing, thereby affording means whereby the ends of shafts connected to the stub-shafts of the series of said gears may be caused to rotate in unison about the central rod, which remains stationary.

By the provision of the central rod having the grooves in which the set-screws holding the segment-gears travel the segments are prevented from twisting or jumping from their positions under strain, thus giving as much power to the elbows as to the shaft.

From the foregoing it will be noted that by the provision of the apparatus shown and described a simple and efficient means is afforded for transmitting power through the medium of an elbow, whereby a shaft may be caused to rotate at angles for convenience or for any other purpose.

1. A rigid rotatable elbow connection for shafts comprising, in combination with two stub-shafts, a rigid non-rotatable rod having swivel connections with said shafts, and a series of intermeshing gears swiveled upon said rod and having gear connections with said shafts, as set forth.

2. A rigid rotatable elbow connection for shafts comprising, in combination with two stub-shafts, a rigid non-rotatable rod having swivel connections with said shafts, a series of intermeshing gears swiveled upon said rod, said rod being provided with a series of annular grooves, screws passing through said gears and engaging said grooves, whereby the gears will be swivelly connected to the rod and connections between said gears and shafts, as set forth.

3. A rigid rotatable elbow connection for shafts comprising, in combination with two stub-shafts, a rigid non-rotatable rod having swivel connections with said shafts, a series of intermeshing gears swiveled upon said rod, the gears having countersunken apertures diametrically opposite each other, screws fitted one in each of said holes and each having its inner end extending into a groove in the rod, and teeth upon the inner end of each stub-shaft meshing with the teeth of an end gear of the series, as set forth.

4. A rigid rotatable elbow connection for shafts comprising, in combination with two stub-shafts, each having a recessed end, a rigid non-rotatable rod with annular grooves therein having swivel connections in the recesses of said shafts, screws passing through oppositely-disposed apertures formed diametrically in each stub-shaft and leading into the recesses formed therein, and a series of intermeshing gears swiveled upon said rod and having gear connection with said shafts, as set forth.

5. A rigid rotatable elbow connection for shafts comprising, in combination with two stub-shafts, a recess in one end of each of said shafts, screws passing through oppositely-disposed apertures formed diametrically in each stub-shaft and leading into the recesses formed therein, a rigid curved rod having a series of annular grooves, each end of the rod engaging a recess in a stub-shaft in which it has swivel connection, and a series of intermeshing gears swiveled upon said rod, the adjacent end of each shaft having an annular series of teeth designed to intermesh with the teeth of the end gears of said series, as set forth.

In testimony whereof I hereunto affix my signature in the presence of two witnesses.

MORRIS C. LOCKWOOD.

Witnesses:
A. L. HOUGH,
HARRY MICKLE.